Oct. 19, 1937. L. J. BAZZONI 2,095,953
SHOE AND METHOD OF MAKING THE SAME
Filed Jan. 6, 1936 6 Sheets-Sheet 1
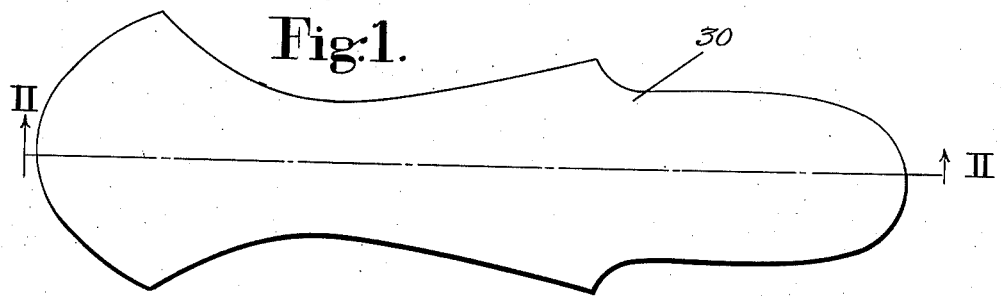
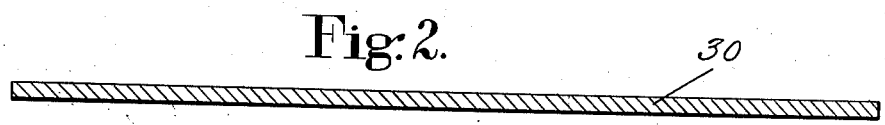
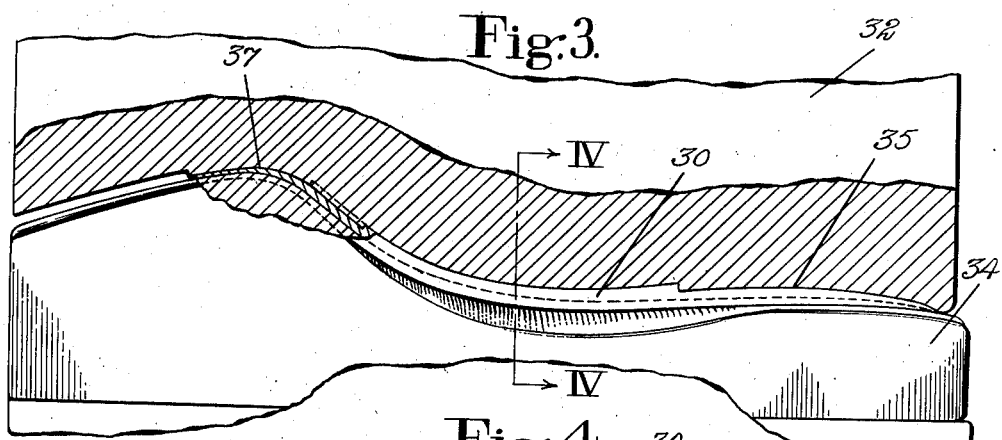
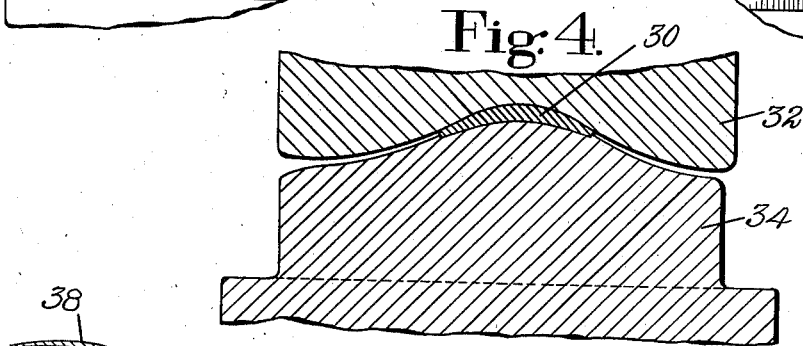
INVENTOR
Lewis J. Bazzoni
By his attorney
Harlow M. Davis Oct. 19, 1937.  L. J. BAZZONI  2,095,953
SHOE AND METHOD OF MAKING THE SAME
Filed Jan. 6, 1936  6 Sheets-Sheet 2

INVENTOR
Lewis J. Bazzoni
By his Attorney
Harlow M. Davis

Oct. 19, 1937.  L. J. BAZZONI  2,095,953
SHOE AND METHOD OF MAKING THE SAME
Filed Jan. 6, 1936  6 Sheets-Sheet 3
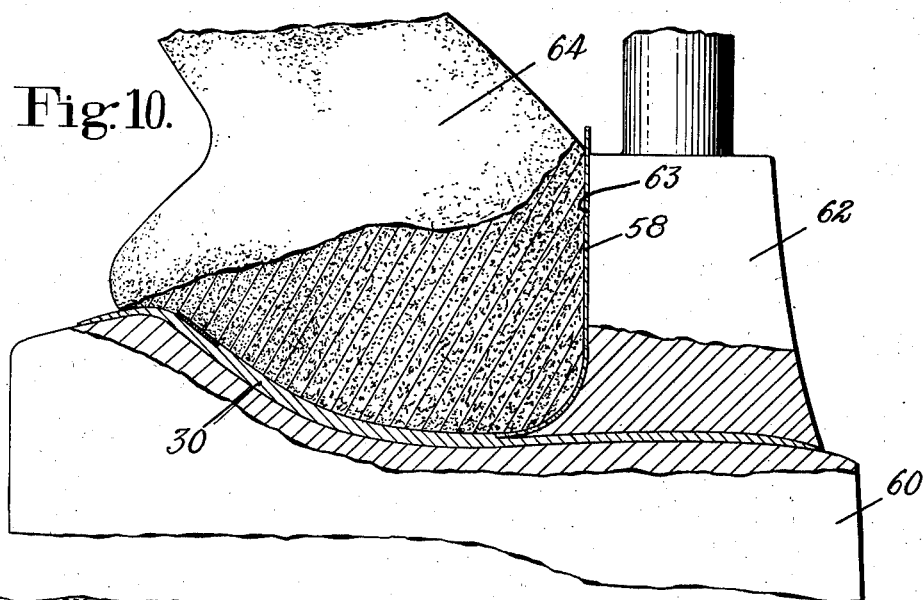
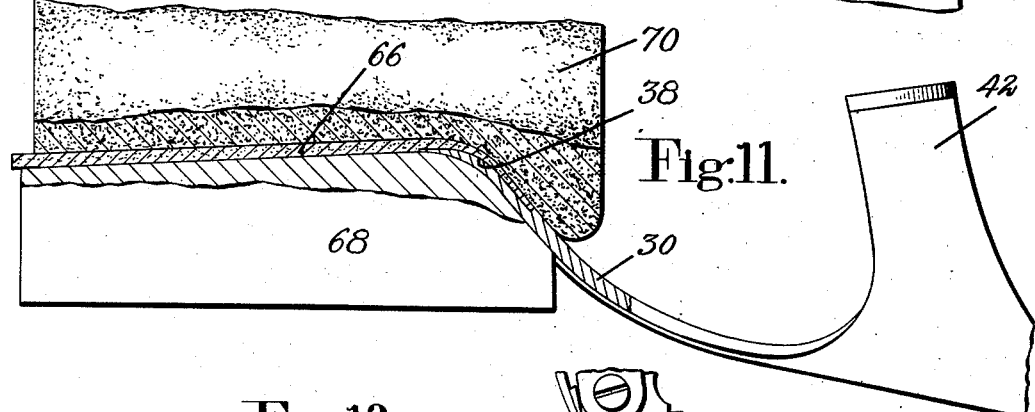
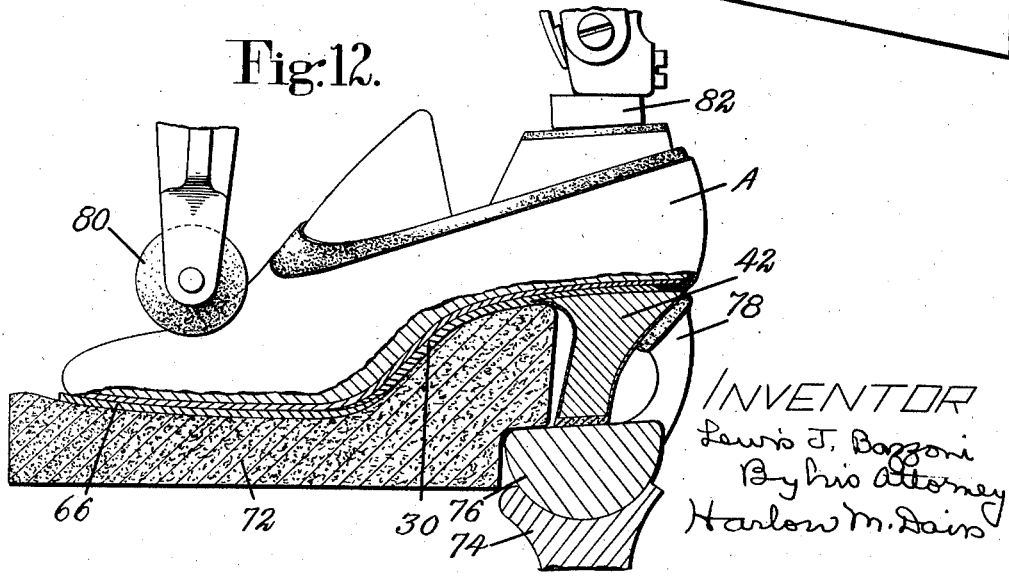

Oct. 19, 1937.  L. J. BAZZONI  2,095,953
SHOE AND METHOD OF MAKING THE SAME
Filed Jan. 6, 1936  6 Sheets-Sheet 4
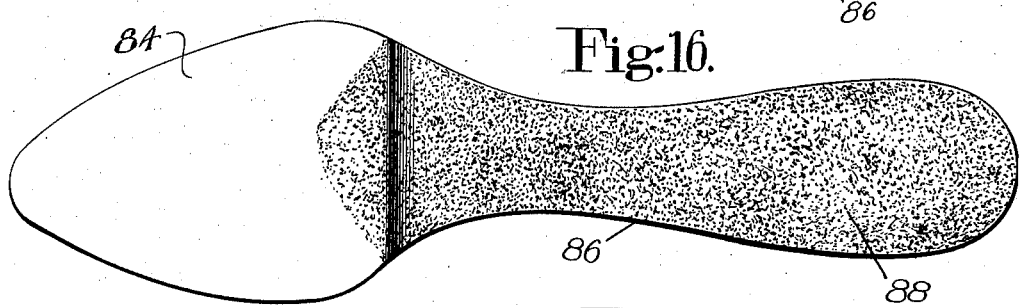
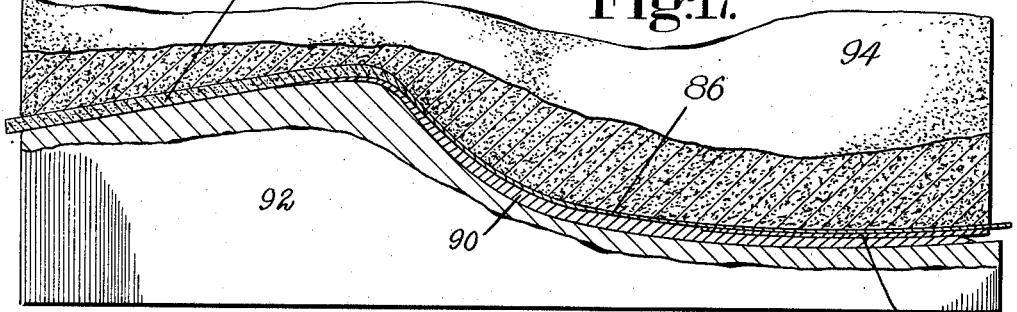
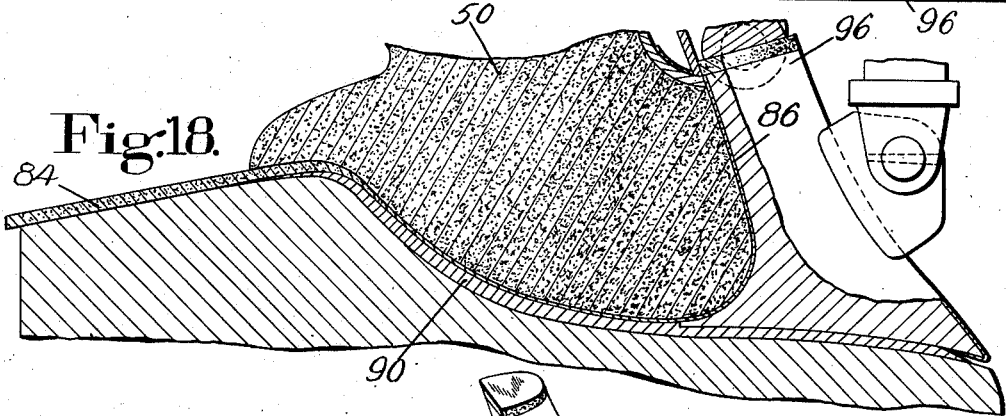
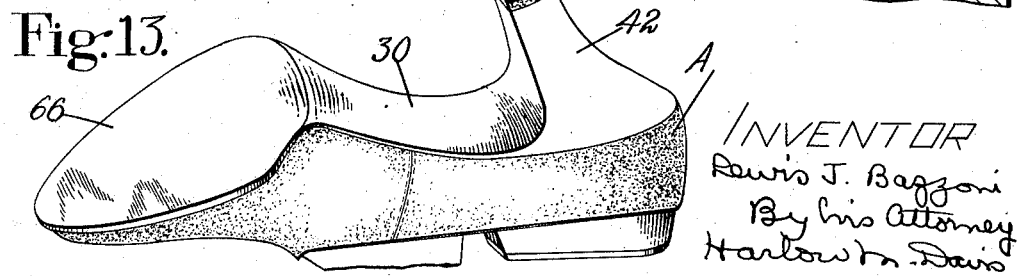

Oct. 19, 1937.  L. J. BAZZONI  2,095,953
SHOE AND METHOD OF MAKING THE SAME
Filed Jan. 6, 1936  6 Sheets—Sheet 6
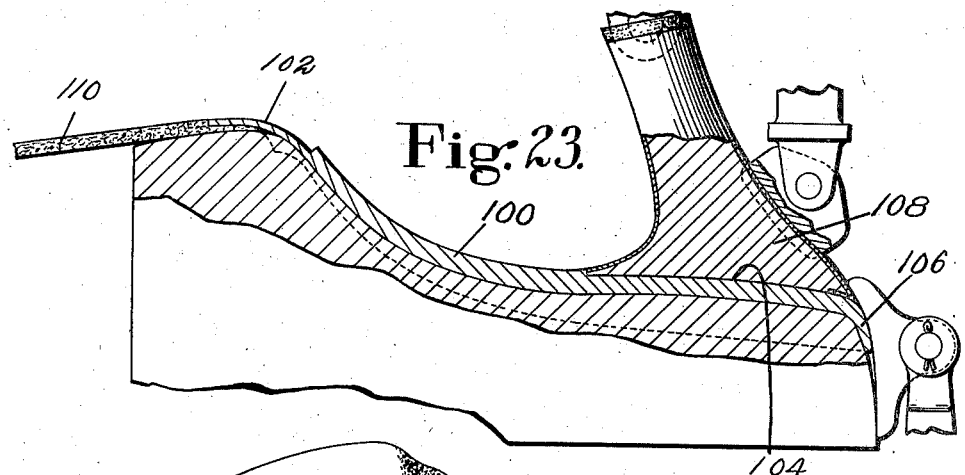
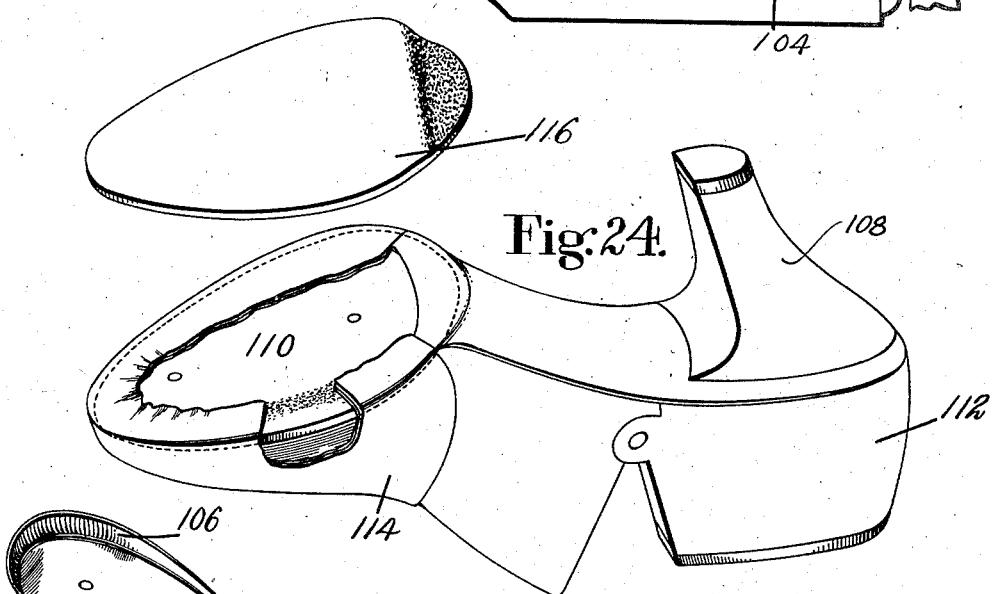
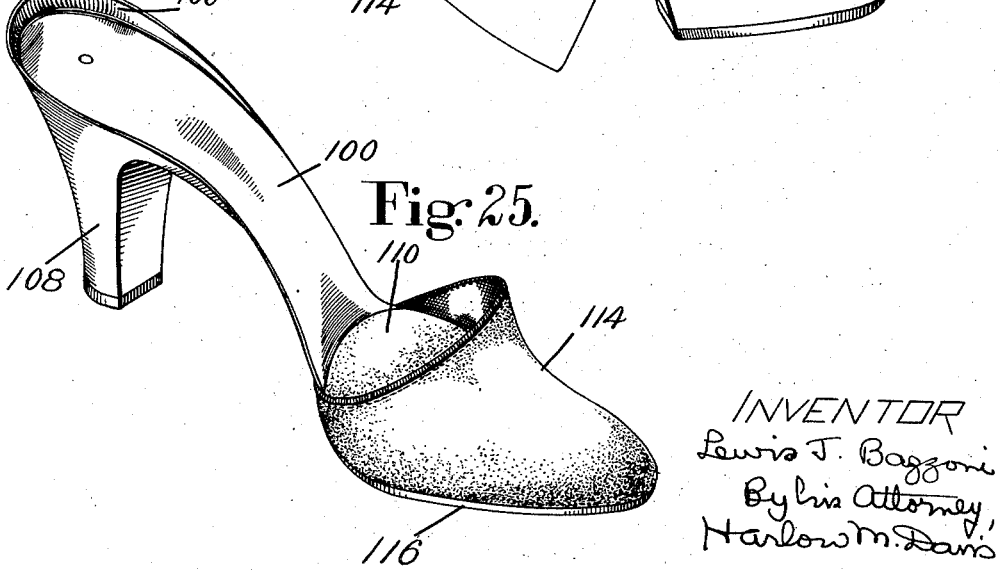

Patented Oct. 19, 1937

2,095,953

UNITED STATES PATENT OFFICE 2,095,953

SHOE AND METHOD OF MAKING THE SAME

Lewis J. Bazzoni, Swampscott, Mass., assignor to United Shoe Machinery Corporation, Paterson, N. J., a corporation of New Jersey Application January 6, 1936, Serial No. 57,751

39 Claims. (Cl. 12—142)

This invention relates to the art of shoemaking and to improvements in shoes and bottom units therefor and is illustrated herein with reference to shoes having their outsoles attached by cement.

Objects of the invention are to provide an improved method of making shoes having bottom units attached by cement, to provide improved bottom units for shoes and to provide an improved method of making shoe bottom units.

In accordance with one aspect of the invention a relatively inflexible shoe bottom member or unit is formed with a depression in its outer surface and another shoe bottom member, for example, a heel, is secured in said depression, after which the shoe bottom member may be applied as a unit to a shoe. As herein illustrated, before its attachment to a shoe the integral shoe bottom member is preferably covered with suitable covering material at its rear portion so that it will serve as a finished outsole for the shoe without further operations thereon. The illustrated shoe bottom member or unit conforms in shape to the shank and heel portions of a last bottom and is composed of relatively inflexible material such, for example, as Celluloid. The bottom member may be molded to the shape of a last bottom, for example, by heated molds or if desired, by softening the bottom member in hot water and molding it between rigid molds before it cools. The indentation or depression formed in the outer surface of the bottom unit for receiving a heel and a depression for receiving a forepart sole member, which is also attached thereto, may be formed during the molding operation, the heel-receiving depression being shaped to fit the concavity in the attaching face of the heel. A forepart sole member of relatively flexible material may thereafter be attached to the forward end of the shoe bottom unit by fitting it into the depression in the forward end of the unit and securing it therein, thereby completing construction of the shoe bottom member, the forepart sole member being preferably formed of leather or similar material and being attached to the bottom unit by an adhesive such, for example, as pyroxylin cement.

In accordance with another aspect of the invention the shank portion and the integral heel of the shoe bottom or outsole member are preferably covered with material such, for example, as sheet Celluloid or other ornamental material prior to the attachment of the flexible forepart sole portion thereto, although in one of its modifications the illustrated invention also provides for covering the shank and the breast portion of the heel with a layer of material integral with the forepart sole member and secured to the shank portion and the breast of the heel after the attachment of the forepart sole member to the shoe bottom unit. The covering on side and rear portions of the heel, as herein illustrated, is preferably applied before the attachment of the heel to the bottom unit to form a complete shoe bottom member, thereby leaving the breast of the heel to be covered with Celluloid, leather, or similar material after the heel has been rigidly secured in the depression in the bottom unit.

In accordance with a further aspect of the invention a relatively stiff shoe bottom unit or shank piece somewhat greater in size than a last bottom is shaped or molded in the manner described and is provided during the molding operation with heel and sole-receiving depressions and an integral upstanding flange which extends around the periphery of the heel-seat portion of the bottom member and takes the place of an upper in a shoe such as a mule having an upper at its forepart only. A pre-covered heel is secured to the shoe bottom member after the latter has been molded to the shape of the last bottom and after its heel-seat portion has been shaped to fit the depression in the attaching face of a heel. A flexible forepart sole member may then be secured in the depression in the forward end of the bottom member and the completed shoe bottom member mounted as a unit on the bottom of a last. The shoe upper arranged to cover only the forepart of the last may be secured in lasted relation to the forepart sole member, for example by cement, and a short outsole for the forepart of the shoe may be secured to the overlasted upper and the insole preferably by cement, although it could, if desired, be secured to the shoe bottom in other ways.

In its article aspects the invention provides an improved shoe having an upper, an insole, and an outsole member or unit including a heel, the outsole unit being formed of relatively inflexible material at the shank and heel portions and of relatively flexible material at its forepart. The heel is fitted into a depression formed in the rear portion of the outer surface of the outsole member and shaped to fit the concavity in the attaching face of the heel and the shank portion of said outsole member and the breast of the heel are covered with sheet material which may, for example, be the same as that covering the heel or, if desired, may be the same as that from which the forepart sole member is made.

The invention also provides, as an article of manufacture, a complete shoe bottom member adapted for attachment as a unit to a lasted shoe and having a forepart of relatively flexible material such as leather and a relatively inflexible shank and heel portion premolded to the shape of a last bottom and having depressions in its outer surface for receiving a heel and a forepart sole member. The shoe bottom member may have a covering on its shank portion, said covering extending over the breast of a precovered heel and, in one of its forms, the shoe bottom member may be provided at its rear portion with an integral upstanding flange which will take the place of an upper in a shoe having an upper at its forepart only.

With the above and other objects and features in view the invention will now be described with reference to the accompanying drawings and thereafter pointed out in the appended claims.

In the drawings,

Fig. 1 is a plan view of a relatively inflexible outsole member utilized in practicing the illustrated method;

Fig. 2 is a longitudinal sectional view of the outsole member taken on the line II—II of Fig. 1;

Fig. 3 illustrates the outsole member being molded to the required shape;

Fig. 4 is a transverse sectional view taken on the line IV—IV of Fig. 3;

Fig. 5 is a longitudinal sectional view of the outsole member after it has been molded;

Fig. 10 illustrates another way of providing a flap for covering the breast of the heel;

Fig. 11 illustrates a method of attaching a forepart sole member to the combined outsole member and heel;

Fig. 12 illustrates the attachment of the entire shoe bottom member as a unit to a shoe;

Fig. 13 is a perspective view of the bottom of the completed shoe;

Fig. 14 is a side elevation of a leather outsole blank which is to be used in carrying out a modification of the method;

Fig. 15 is a longitudinal section of the outsole after it has been skived to a thin layer rearwardly of the ball line;

Fig. 16 is a plan view of the outsole with cement applied to its inner face rearwardly of the ball line;

Fig. 17 shows the outsole being cemented to a stiff outsole member similar to that illustrated in Fig. 5;

Fig. 18 illustrates the attachment of a heel to the combined sole member of Fig. 17 and the laying of the heel breast flap;

Fig. 23 shows a forepart sole member attached to the outsole member and a covered heel being applied thereto;

Fig. 24 is a perspective view of the shoe bottom unit mounted on a last with an upper which covers only the forepart of the last secured in lasted relation thereto, and a short outsole ready to be applied; and Fig. 25 is a perspective view of the completed shoe.

In practicing the method of the present invention a shoe bottom or outsole member 30 of substantially uniform thickness throughout, as illustrated in Fig. 2, is formed of relatively inflexible material, such for example, as Celluloid or similar material. The forward portion of said member, as shown in Fig. 1, is shaped to conform in outline to that of the shank portion of a last bottom and its heel seat portion is also shaped to conform to the periphery of the bottom of a last but is somewhat smaller in size so that it will fit the hollow or depression in the attaching face of a conventional wood heel. The shoe bottom member 30 may conveniently be cut or rounded to the desired shape with the aid of a sole rounding machine of the type shown in Letters Patent of the United States Nos. 881,994 and 882,009, granted March 17, 1908, upon applications of C. L. Allen and B. F. Mayo, respectively, although this operation may, of course, be performed with the aid of other machines or by hand, if desired. The forward end of the shoe bottom member is substantially semi-circular in contour to provide a portion adapted for attachment to another shoe bottom member as will be hereinafter described.

Figure 6:
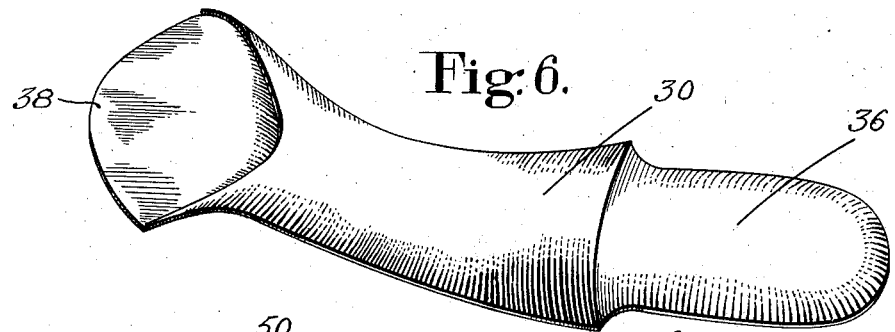
Fig. 6 is a perspective view of the molded member illustrating depressions formed therein for receiving a heel and a forepart sole member.

The shoe bottom member 30 is next conformed to the shape of the shank and heel portions of a last bottom by molding it between molds 32, 34, preferably formed of metal. The molding operation may conveniently be performed with the aid of a machine of the type described in an application for Letters Patent of the United States Serial No. 701,814, filed December 11, 1933, in the name of John M. Whelton, this machine, as illustrated in the application referred to, being provided with a stationary mold or pad and a form movable into position to cooperate with the pad and adapted to mold the shoe bottom member in the required manner. The lower mold 34 illustrated in Fig. 3 conforms substantially to the shape of a last bottom and the upper mold 32 is substantially complemental thereto but is provided with raised portions or projections 35, 37 located respectively at the heel seat portion of the mold and at the forward end of its shank portion to provide depressions or recesses in the shoe bottom member 30 for receiving a heel and a forepart sole member, as will be presently explained. The molds are preferably heated in any known or usual manner so that the celluloid member 30 will be softened sufficiently to permit its being molded into the desired shape. If desired, instead of heating the molds 32, 34 they may be operated under hot water which will have the desired softening effect upon the celluloid member 30 and will also prevent it from cooling too quickly after being molded, thereby eliminating the danger of the Celluloid cracking after it is incorporated in a shoe. Fig. 5 is a longitudinal section showing the celluloid shoe bottom member 30 molded to the required shape and illustrating also the location and size of the depressions 36 and 38 molded in the heel seat portion of its outer surface and in the forward end of its shank portion by the projections 35, 37 on the mold 32. The projection 35 on the upper mold is also shaped on its lower surface to correspond to the depression or concavity in the attaching face of a conventional wood heel, thereby imparting to the heel portion of the celluloid member a shape which conforms substantially to the inner surface of the heel which is to be fitted thereto. Fig. 6 illustrates the shank piece in perspective and shows more clearly the shape and location of the depression 38 for receiving the forepart sole member and the shape of the heel seat portion 36 to which a wood heel is to be attached.

Figure 7:
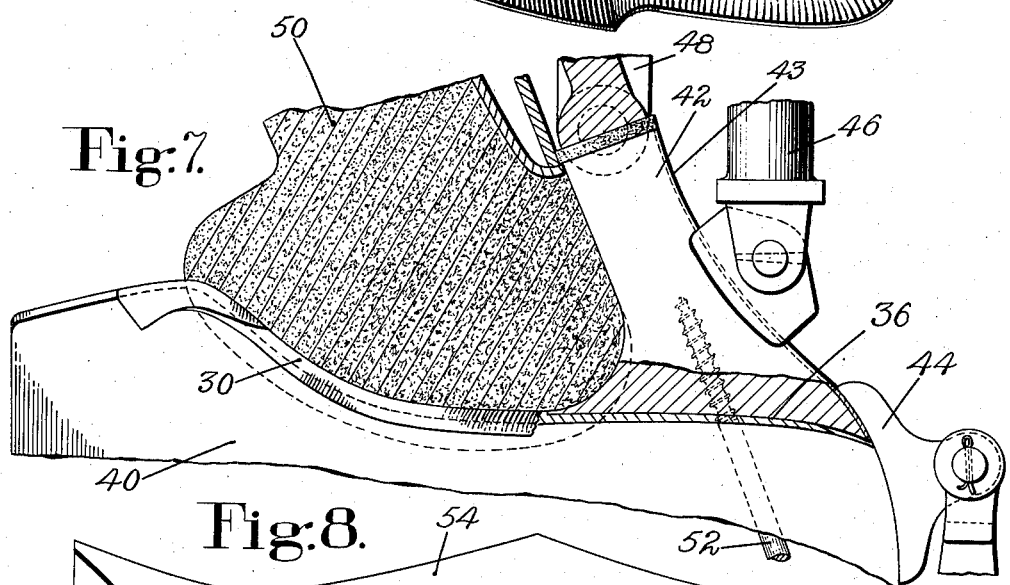
Fig. 7 illustrates the attachment of a heel to the outsole member.

The pre-molded shoe bottom member 30 is mounted on a form such as the bottom of a last 40 (Fig. 7) and a wood heel 42, herein illustrated as a Louis heel and previously covered at its rear and side portions with ornamental material such, for example, as a thin sheet of Celluloid 43, is fitted into the depression 36 and rigidly attached to the outsole member to form an integral shoe bottom unit. The heel 42 may be conveniently attached with the aid of a heel-attaching machine of the type disclosed in Letters Patent of the United States No. 2,076,537, granted April 13, 1937 on an application filed December 17, 1934, in the name of the present inventor. As herein illustrated, such a machine is provided with a back gage 44 for positioning the shoe bottom member relatively to the bottom of a last and with heel-engaging members or clamps 46, 48 for supporting and applying pressure to the heel during the attaching operation. A resilient bag or pad 50 is provided for simultaneously engaging the shank portion of the shoe bottom member and the breast of the heel and applying pressure to these portions and, when necessary or desirable, for laying a covering or flap against the breast of the heel to attach it permanently thereto. The heel 42 is preferably secured to the celluloid shoe bottom member 30 by pyroxylin cement, although other adhesives such as hot glue or thermoplastic cement such as that disclosed in an application for Letters Patent of the United States Serial No. 47,284, filed October 29, 1935, in the name of Francis L. Brandt, have been used with satisfactory results. If desired, a usual heel-attaching screw 52 may also be temporarily inserted to insure a permanent attachment of the heel to the celluloid member.

Figure 8:
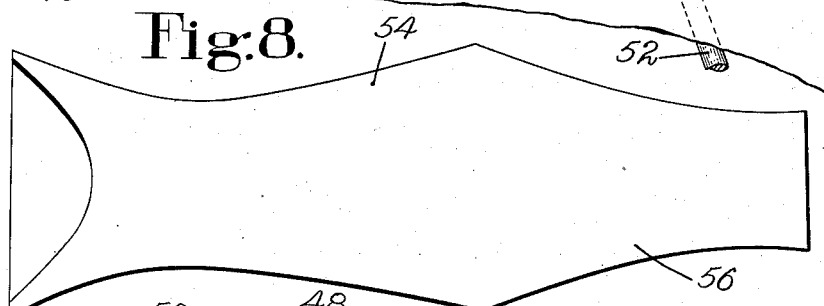
Fig. 8 is a plan view of a thin layer of sheet material which is utilized to cover the outsole member and the breast of the heel.
Figure 9:
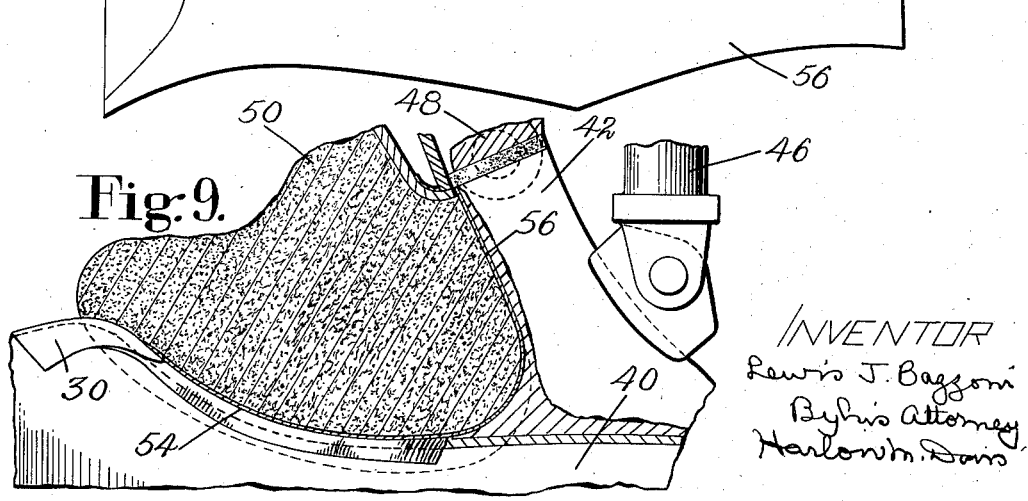
Fig. 9 shows the sheet material being applied to the outsole member and the breast of the heel.

After the heel 42 has been rigidly secured to the celluloid shoe bottom member 30, it is desirable to cover the outer surface of this member (which is to form a part of the outsole on the finished shoe) and the breast portion of the heel with sheet material such, for example, as that covering the sides of the wood heel 42. Accordingly, a thin layer of Celluloid 54 (Fig. 8) is cut to conform substantially to the shape of the shank portion of the shoe bottom member 30 and is provided with a rear portion 56 for covering the breast of the heel 42. The layer 54 is preferably cut larger than the shank piece and the breast of the heel so that after it is permanently attached thereto it may be trimmed at the edges to conform exactly to the size of these members. The celluloid layer 54 is preferably attached by pyroxylin cement with the aid of the heel attaching machine referred to above, as shown in Fig. 9, the resilient pad 50 conforming the flap accurately to the shank portion of the shoe bottom member and pressing the rear portion 56 firmly against the breast of the heel. After the cement has set the excess margins of the layer 54 may be trimmed off in any usual or convenient manner.

While the breast of the heel may be covered by a separate continuous layer of material cemented to the shoe bottom unit as just described, it is within the scope of the invention to provide on the celluloid bottom member 30 an integral heel breast flap 58, as shown in Fig. 10, and, while the member 30 is still in a softened condition, to mold this flap into an upwardly extending position with the aid of a lower mold 60 and a form 62 arranged also to mold the heel-seat portion of the shoe bottom member to conform in shape to the hollow in the attaching face of a wood heel, the form 62 having a surface 63 thereon for turning the integral flap 58 into an upwardly extending position in which it is held until the member hardens by a resilient pad 64 which may be somewhat larger than the usual flap applying pad 50 of the heel attaching machine.

After the heel 42 has been attached to the celluloid shoe bottom member 30 and the covering material has been secured to the side and rear surfaces and to the breast of the heel as described, a forepart sole member 66 is secured to the forward end of the shoe bottom member, this operation being illustrated in Fig. 11 and being preferably performed with the aid of a rigid form 68 and a resilient mold 70, the rear portion of the latter being arranged to overlap the relatively abrupt curve at the forward end of the shoe bottom member and thus to press the sole member, which is preferably of leather, into the depression or recess 38 in the forward end of the celluloid member 30. The forepart sole member 66 is preferably attached to the bottom member 30 by pyroxylin cement although other securing means may be used if desired. The shoe bottom member is now complete and ready for attachment as a unit to the bottom of a lasted shoe. The relatively inflexible portion formed by the celluloid member 30 will form the outsole at the shank and heel portions of the shoe and serve to stiffen those portions without the aid of a usual steel shank piece or stiffener while the relatively flexible leather forepart 66 will provide the desired flexibility at the forepart of the shoe.

Fig. 12 illustrates the final operation of attaching the completed shoe bottom member as a unit to the bottom of a lasted shoe A, this operation being preferably performed with the aid of a sole laying machine of the type disclosed in Letters Patent of the United States No. 1,549,243, granted August 11, 1925, on an application filed in the name of Erastus E. Winkley. The overlasted portions of shoe uppers are roughened in the usual manner and cement, preferably pyroxylin, is applied thereto and to the marginal portions of the inner or attaching surface of the shoe bottom member. The cement is then activated by a solvent and, after the members are properly located relatively to each other, they are placed on a resilient pad 72 with which the machine may be provided constructed and arranged to engage only the forepart and shank portions of the shoe bottom, thereby leaving space for the heel of the integral shoe bottom unit. In order that sufficient pressure may be applied to the heel portion of the bottom unit, the pad box of the machine may also be provided with heel-engaging mechanism comprising a rigid support 74 having a circular depression therein in which is adjustably mounted a block 76 having a surface thereon for engaging the bottom of the heel and having an upwardly extending arm 78 adapted to engage the rear portion of the heel adjacent to its upper end and thus to assist in causing substantially the same pressure to be applied through the heel to the heel seat portion of the shoe bottom member as is applied by the pad to the forepart and shank portions thereof. As disclosed in the Winkley patent referred to, the illustrated shoe A is supported against pressure applied thereto by a forepart engaging roll 80 and a last engaging abutment 82. The completed shoe A is illustrated in Fig. 13 which shows the shoe inverted to illustrate how the shoe bottom unit will appear after its attachment to the shoe.

Figure 19:
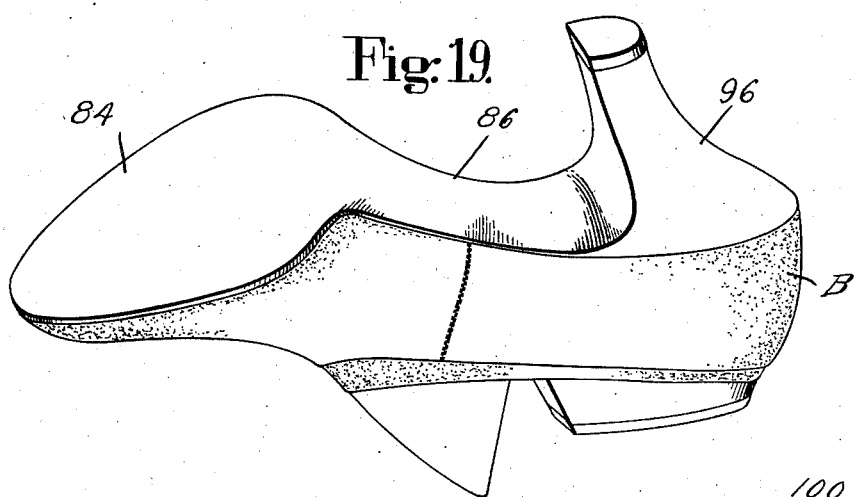
Fig. 19 is a perspective view of the bottom of the completed shoe.

If it is desired to cover the shank portion of the celluloid shoe bottom member and the breast of the heel with material different from the Celluloid which covers the side and rear portions of the heel, a modification of the invention provides a method for covering these portions with a thin layer of material integral with the forepart sole member of the shoe bottom unit. A full-length leather outsole 84 (Fig. 14) is split lengthwise from the heel end substantially to the ball line and the layer or skiving on the flesh side is removed, as shown in Fig. 15, thus leaving a thin outer layer or flap 86, the outer surface of which contains the grain surface of the leather. The inner surface of the flap 86 is then coated with cement 88 such as pyroxylin and the outsole is attached to a premolded celluloid shoe bottom member 90 by molds 92, 94. In order that the rear portion of the outer layer or flap 86 shall not stick to the heel seat portion of the celluloid member 90 a thin metal plate 96 may be inserted between the flap and the depression in the heel seat portion of the member 90. A wood heel 96 is then attached to the heel seat portion of the shoe bottom member 90 with the aid of the heel-attaching machine referred to and the leather breast flap 86 may be pressed against the breast of the heel by the resilient pad 50 in the manner already described. Fig. 19 illustrates a completed shoe B with the shoe bottom unit of Fig. 18 attached thereto and illustrates how the integral flap 86 of the forepart outsole portion 84 covers the shank portion of the celluloid member 90 and the breast of the heel 96 to give the appearance of a full-length leather outsole with the breast of the heel covered by a heel breast flap separated in the usual manner from the outsole. The complete shoe bottom member of Fig. 18 may be attached as a unit to the shoe B by pyroxylin cement, as described above.

Figure 20:
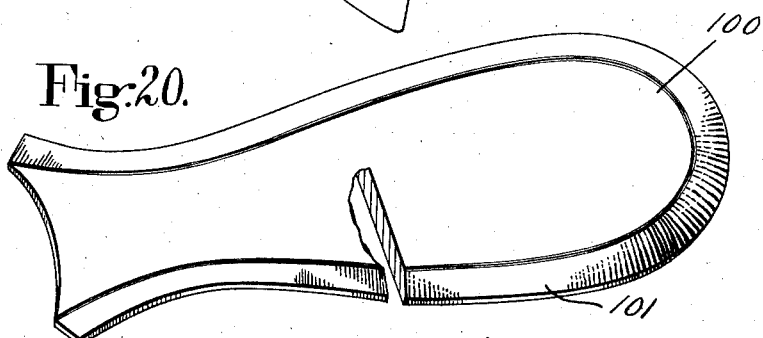
Fig. 20 is a perspective view of a form of outsole member which may be utilized in practicing another modification of the invention.
Figure 21:
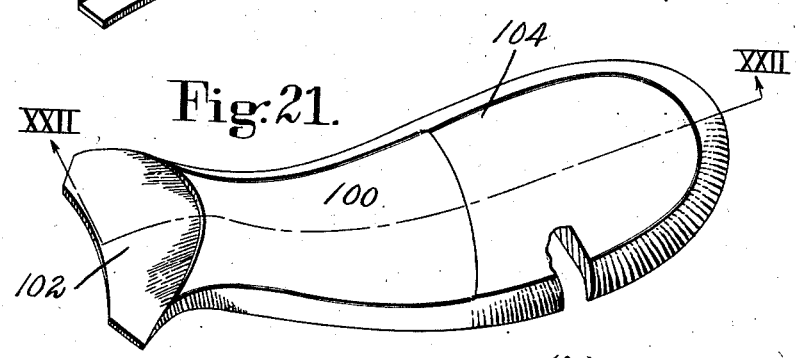
Fig. 21 is a perspective view of the outsole member after it has been molded to the required shape.
Figure 22:
Fig. 22 is a longitudinal section of the member taken on the line XXII—XXII of Fig. 21.

The illustrated invention also provides an improved method of making complete shoe bottom units having relatively stiff shank and heel portions with heels rigidly attached thereto and flexible leather foreparts for use in shoes such as mules in which the upper covers only the forepart of the shoe. In accordance with this modification of the invention a relatively thick shoe bottom member 100 of material such as Celluloid is formed with the aid of a sole rounding machine to conform in outline to the periphery of the shank and heel portions of a last bottom but with the aid of a sole pattern which is from one-half to three-quarters of an inch larger than the last bottom. The marginal portions of the shank piece are then beveled to a relatively thin edge either by cutting or molding, as shown at 101 in Fig. 20, and the shoe bottom member is softened by heat and conformed by molds to the shape of a last bottom, as shown in Fig. 21. The upper mold has a projection thereon to form a depression or recess 102 at the forepart of the shoe bottom member for receiving a short leather outsole and another projection to form depression 104 at the heel seat portion of the member for receiving a conventional wood heel. The marginal portions of the upper mold are arranged to extend over the edges of the lower mold or last bottom to cause the reduced margins of the member 100 to be bent downwardly as viewed in Figs. 21 and 22 to form a peripheral flange 106 which, when the shank piece is inverted into the position it will assume in a shoe, will extend upwardly to take the place of an upper at the rear portion of the shoe or mule. The heel seat portion 104 of the celluloid member 100 is also conformed in the molding operation to fit the cup or depression in a wood heel 108 (Fig. 23) which can be applied directly thereto without a heel seat fitting operation.

After the precovered heel 108 is attached to the celluloid shoe bottom member 100, in the manner described, and a forepart insole member 110 is secured by cement to the forward end of the celluloid member, the entire shoe bottom unit is mounted on a last 112 and a shoe upper 114, arranged to cover only the forepart of the last, is assembled thereon. The marginal portions of the upper 114 are secured by adhesive, for example, pyroxylin cement, in lasted relation to the insole member 110. The overlasted portions of the upper may then be roughened in the usual manner and coated with pyroxylin cement and a forepart outsole 116 may be secured in the depression in the forward end of the celluloid member to complete the construction of the shoe. The shoe or mule having an upstanding peripheral flange in place of an upper at its rear portion is illustrated in Fig. 25. Since this type of shoe is provided with an insole only at the forepart a sock lining or a slip sole (not shown) may, if desired, be secured in the usual manner to the inner surfaces of the celluloid member 100 and the insole 110 to provide a smooth surface for engaging the foot and to cover the joint between the insole member and the celluloid shoe bottom member 100.

Having described my invention, what I claim as new and desire to secure by Letters Patent of the United States is:

1. That improvement in methods of making shoes which comprises shaping a relatively stiff shoe bottom member to conform on both sides to the shape of the shank and heel portions of a last bottom, molding a depression in said member having a smooth convex surface for receiving a heel, securing a heel in said depression, and attaching the shoe bottom member to a shoe.

2. That improvement in methods of making shoes which comprises shaping a shoe bottom member of substantially uniform thickness to conform to the shank and heel portions of a last bottom, making a deprssion in said member for receiving an outsole, molding a depression having a smooth convex surface in said member for receiving a heel, securing a heel in the heel-receiving depression thereby forming an integral shoe bottom unit, and attaching said unit to the bottom of a shoe.

3. That improvement in methods of making shoes which comprises shaping a shoe bottom member to conform on its inner and outer surfaces to the shape of the shank and heel portions of a last bottom, making depressions in said member for receiving an outsole and a heel, securing a heel and a short outsole in said depressions thereby forming a complete shoe bottom unit separate from a shoe, and attaching the complete unit to a shoe.

4. That improvement in methods of making shoes which comprises shaping a relatively inflexible shoe bottom member to conform on both surfaces to the shape of the shank and heel portions of a last bottom, forming depressions in the forward and rear portions of the outer surface of said member for receiving an outsole and a heel respectively, fitting a flexible forepart outsole and a wood heel into said depressions and securing them therein with cement thereby forming a complete shoe bottom member, and attaching said member as a unit to a shoe bottom.

5. That improvement in methods of making shoes which comprises forming a shoe bottom member to conform in shape to the shank and heel portions of a last bottom, making a depression therein for receiving a heel, securing a heel in said depression thereby forming an integral shoe bottom unit, applying a covering to said unit, and attaching the precovered unit to a shoe.

6. That improvement in methods of making shoes which comprises shaping a shoe bottom member to conform to the shape of the shank and heel portions of a last bottom, forming depressions in said member for receiving a heel and a forepart sole member, securing a heel in said heel-receiving depression, covering said bottom member and a portion of the heel with sheet material, attaching a forepart sole member in the depression formed therefor, and applying the shoe bottom member as a unit to a shoe.

7. That improvement in methods of making shoes which comprises constructing a shoe bottom unit consisting of a shank piece with a depression in its outer surface and a heel rigidly secured in said depression, covering the breast of the heel and outer surface of the shank piece with ornamental material, securing an outsole member to the forward end of said shank piece to form a complete shoe bottom unit, and thereafter attaching said unit to the bottom of a shoe.

8. That improvement in methods of making shoes which comprises molding a relatively inflexible shank and heel piece to the shape of a last bottom, forming a heel-receiving depression in its rear portion, attaching a partially covered heel in said depression, forming a complete sole unit by securing a forepart sole member to the forward end of the shank and heel piece, covering the outer surface of the shank and heel piece and the uncovered portion of the heel with a thin continuous layer of sheet material, and applying said unit to the bottom of a shoe.

9. That improvement in methods of making shoes which comprises shaping a relatively inflexible member to conform in outline to the periphery of the shank and heel portions of a last bottom, temporarily softening said member and molding it to the shape of the last bottom with heel and outsole receiving depressions in its outer face, attaching a heel in said heel-receiving depression after the member has hardened again, covering the member including the breast of the heel with sheet material, securing a forepart outsole in the outsole-receiving depression, and attaching the completed shoe bottom member to a lasted shoe bottom.

10. That improvement in methods of making shoes which comprises shaping a relatively inflexible shank piece to conform to the periphery of the shank portion of a last bottom but making the rear portion of said shank piece smaller than the heel portion of said last bottom, applying heat to soften said shank piece and molding its inner surface to conform to the shape of the last bottom and molding a depression in the outer side of its rear portion to fit the concavity in the attaching face of a heel, rigidly securing a covered heel in said depression without a heel-seat fitting operation, covering the outer surface of the shank piece and the breast of the heel with a continuous layer of sheet material, securing a flexible forepart outsole member to the forward end of said shank piece by cement to form a complete sole unit, and attaching said sole unit to a shoe bottom.

11. That improvement in methods of making shoes which comprises forming separately from a shoe a shoe bottom unit consisting of an outsole member with a depression in its outer face and a heel secured in said depression, attaching a forepart sole member to said unit, covering the outsole member and the breast of the heel with a layer of material integral with the forepart sole member but thinner than said member, and attaching the unit to the bottom of a shoe.

12. That improvement in methods of making shoes which comprises forming a shoe bottom unit consisting of a relatively stiff outsole member with a heel rigidly secured in a depression in the outer surface of said member corresponding in shape to the attaching surface of the heel, attaching a flexible forepart outsole member to the forward end of said shoe bottom unit, covering the outer surface of said unit and the breast of the heel with a continuous layer of material integral with but thinner than said forepart outsole member, and attaching the shoe bottom unit to a shoe.

13. That improvement in methods of making shoes which consists in shaping a relatively inflexible shoe bottom member to the periphery of the shank and heel portions of a last bottom, temporarily softening said member and molding it to the contour of said last bottom but with a heel-receiving depression in its outer surface, skiving a flexible full-length outsole to form a thin continuous layer rearwardly of its ball line, permanently securing said outsole to the premolded shoe bottom member, attaching a heel in the heel-receiving depression, covering the outer surface of said member and the breast of the heel with the continuous layer on the outsole, and attaching said shoe bottom member as a unit to a lasted shoe.

14. That improvement in methods of making shoes which comprises shaping a shoe bottom unit to conform on its inner and outer surfaces to the shank and heel portions of a last bottom, forming a convex heel-receiving depression in said unit for receiving the concave attaching face of a heel, forming an upstanding peripheral flange around the rear portion of said unit, securing a heel in said convex depression, and incorporating the preformed unit in a shoe having an upper only at its forepart, said unit forming the entire rear portion of the finished shoe.

15. That improvement in methods of making shoes which comprises softening a relatively inflexible shank piece and molding it to form depressions in its outer surface for receiving a heel and a forepart sole member and to form an upstanding peripheral flange at the rear portion of the shank piece, fitting a heel and a forepart sole member in said depressions and securing them therein to form an integral shoe bottom member, and applying said member to the bottom of a shoe.

16. That improvement in methods of making shoes which comprises forming a shoe bottom unit consisting of an outsole member with depressions in the forward and rear portions of its outer surface, attaching a forepart sole member and a heel in the depressions in said unit, mounting the unit on the bottom of a last, securing a shoe upper in lasted relation to the forepart sole member, and attaching an outsole to the forepart of the shoe bottom.

17. That improvement in methods of making shoes which comprises shaping a shoe bottom unit consisting of a relatively stiff shank and heel piece to the contour of a last bottom and forming a depression in the rear portion of its outer surface, rigidly attaching a covered heel in the depression in said rear portion, securing a forepart insole member to the forward portion of said unit, mounting the unit on the bottom of a last, securing the margin of a shoe upper in lasted relation to said insole member, said upper being arranged to form only the forepart of the shoe, and attaching a short outsole to the forepart of the shoe bottom to complete the shoe.

18. That improvement in methods of making shoes which comprises softening a relatively stiff shank and heel piece, molding depressions in its forward and heel portions and an upwardly extending peripheral flange at said heel portion, rigidly securing a pre-covered heel in the depression in said heel portion, attaching a flexible forepart insole to the forward end of the shank and heel piece, thereby forming an integral sole unit, assembling said unit on a last with an upper arranged to cover only the forepart of the last, securing the margins of the upper in lasted relation to the forepart insole with cement, and securing a short outsole in the depression in the forward end of the sole unit.

19. That improvement in methods of making shoe parts which comprises shaping a flat shoe bottom member to conform on both sides to the shank and heel portions of a last bottom, molding depressions in said member for receiving a heel and an outsole, said heel depressions extending over the entire heel portion of said member, securing a heel in said heel depression, and securing a short outsole in the outsole depression thereby forming a complete shoe bottom unit.

20. That improvement in methods of making shoe parts which comprises shaping the inner and outer surfaces of a shoe bottom member to conform to the shank and heel portions of a last bottom, molding depressions in the rear and forward portions of said member for receiving a heel and a forepart outsole respectively, rigidly securing a heel in said heel-receiving depression, thereby forming an integral shoe bottom unit, and applying a covering to the entire exposed surface of said unit.

21. That improvement in methods of making shoe parts which comprises shaping a relatively inflexible sole member to conform to the shank and heel portions of a last bottom and forming a heel-receiving depression in said member, rigidly securing a covered heel in said depression, covering the outer surface of said member and the breast of the heel with sheet material, and attaching a short flexible outsole to the forward end of said member.

22. That improvement in methods of making shoe parts which comprises shaping a shoe bottom member to correspond in outline to the shank and heel portions of a last bottom, forming a depression in the rear portion of said member for receiving a heel, and molding an upstanding peripheral flange around the rear portion of said member to serve in place of an upper at the heel portion of a shoe.

23. That improvement in methods of making shoe parts which comprises shaping a shoe bottom member to conform to the shank and heel portions of a last bottom, forming depressions in the forward and rear portions of said member for receiving an outsole and a heel respectively, molding an integral upstanding flange around the periphery of the heel portion of said member, rigidly securing a partially covered heel in said heel-receiving depression and a forepart outsole in the outsole receiving depression, and applying a covering to the uncovered portion of the heel and to the exposed surface of the shoe bottom member.

24. A shoe comprising an upper, an insole, and an outsole member, said outsole member consisting of a shank piece of uniform thickness at its central portion and having depressions in its forward and rear portions, said rear depression extending from the heel breast line to the rear end of the outsole member, and a heel and a forepart outsole fitted respectively into said depressions and permanently secured therein.

25. A shoe comprising an upper, and a shoe bottom member, said shoe bottom member consisting of a relatively inflexible shank piece conforming to the shank and heel portions of a last bottom and having depressions formed in its forward and rear portions, a heel rigidly secured in the depression in said rear portion, a forepart insole attached to the inner side of said forward portion, and a short outsole fitted into the depression in said forward portion and secured therein.

26. A shoe comprising an upper, an insole and an outsole member, said outsole member consisting of a relatively inflexible shank piece with depressions formed in the outer side of its rear and forward portions, a heel rigidly secured in the depression in the rear portion of said shank piece, a forepart insole secured to the inner side of said shank piece, said insole being tapered where it overlaps the shank piece, and a short flexible outsole secured in the depression in the forward portion of said shank piece, said upper being arranged to cover only the forepart of the shoe and being secured between the forepart insole and the short flexible outsole.

27. A shoe comprising an upper, an insole, and an outsole, said outsole being composed of a relatively stiff shank and heel piece having depressions in its outer surface, a heel in one of said depressions, and a relatively flexible forepart sole member in another depression, the entire exposed surfaces of said shank piece and said heel being covered with sheet material.

28. A shoe comprising an upper, an insole and an outsole member composed of relatively inflexible material, said member having depressions in its forward and rear portions, a heel rigidly secured in the depression in said rear portion, a flexible forepart sole member secured in the depression in said forward portion, the outer surface of said outsole member and the breast of the heel being covered with material the same as that from which the outsole member is made.

29. A shoe comprising an upper, an insole and an outsole portion, said outsole portion consisting of a relatively inflexible shank and heel piece having depressions at the forward and rear portions of its outer surface and having an integral upstanding flange at its rear portion, a heel rigidly secured in the depression in the outer surface of said rear portion, an insole secured to the inner side of the forward end of said shank and heel piece, and a forepart outsole secured in the depression in the outer side of said forward portion, said upper being secured between said insole and said outsole and extending over only the forepart of the shoe.

30. A shoe having an outsole unit of relatively stiff material at its shank and heel portions provided with sole- and heel-receiving depressions in its outer surface and having an upwardly extending peripheral flange at its rear portion, a heel rigidly secured in the heel-receiving depression of the outsole unit and covered with a layer of material the same as that from which the unit is made, a forepart insole member joined to the forward end of said outsole unit and composed of relatively flexible material, an upper arranged to extend over the forepart only of the shoe and secured in lasted relation to said insole member by cement, and a short outsole secured in the sole-receiving depression of said outsole unit.

31. As an article of manufacture, a relatively inflexible shoe bottom member the inner and outer surfaces of which conform in shape to the shank and heel portions of a last bottom, a depression in the outer surface of the rear portion of said member, said depression extending from the heel breast line to the end of the heel portion of the shoe bottom member, and a heel rigidly secured in said depression, thereby forming an integral shoe bottom unit.

32. As an article of manufacture, a shoe bottom unit comprising a relatively inflexible outsole member of substantially uniform thickness at its central portion and having a depression in the outer surface of its rear portion for receiving a heel, a heel rigidly secured in said depression, and a covering for said unit.

33. As an article of manufacture, a shoe bottom member for attachment as a unit to a shoe comprising a relatively inflexible outsole member conforming on its opposite sides to the shape of the shank and heel portions of a last bottom and having depressions in the forward and rear portions of its outer surface, the depression in said rear portion terminating substantially at the heel breast line, a heel rigidly secured in the depression in said rear portion, and a flexible forepart sole member secured in the depression in said forward portion.

34. As an article of manufacture, a shoe bottom unit separate from a shoe comprising an outsole member having inner and outer surfaces which conform in shape to the shank and heel portions of a last bottom, a convex depression in the outer surface of the heel portion of said member, a heel rigidly secured in said depression, and an integral upstanding flange around the heel portion of said member to serve in place of an upper in a finished shoe.

35. As an article of manufacture, a shoe bottom unit comprising an outsole member conforming in shape to the shank and heel portions of a last bottom and having an integral upstanding flange formed around the edge of its heel portion, said member also having a depression formed in the outer surface of its heel portion, a heel rigidly secured in the depression in said heel portion, and a forepart insole member secured to the inner surface of the forward portion of said outsole member.

36. As an article of manufacture, a shoe bottom unit comprising a relatively inflexible outsole member conforming in shape to the shank and heel portions of a last bottom, an upstanding flange formed integrally with the periphery of the heel portion of said outsole member, depressions formed on the outer surface of said member at its heel and forward portions, and a heel and a forepart sole member fitted respectively into said depressions and secured therein by cement.

37. As an article of manufacture, a shoe bottom member adapted for attachment as a unit to a shoe comprising an outsole member conforming in shape to the shank and heel portions of a last bottom, depressions in the forward and heel portions of the outer surface of said outsole member, a short outsole and a heel secured respectively in said depressions, and a covering for the heel and the exposed surface of the outsole member.

38. As an article of manufacture, a shoe bottom unit comprising a relatively inflexible outsole member having a depression in its rear portion in which a heel is rigidly secured, a flexible forepart member permanently attached to said outsole member, and a layer of material integral with said forepart member covering the outer surface of the outsole member and the breast of the heel.

39. As an article of manufacture, a shoe bottom member for use in shoes having no uppers at their rear portions comprising a relatively inflexible outsole member conforming in shape to the shank and heel portions of a last bottom and having depressions formed in the forward and rear portions of its outer surface, an integral upstanding flange at the periphery of the heel portion of said member adapted to serve as an upper at the rear portion of a shoe, a precovered heel rigidly secured in the depression in the rear portion of said shoe bottom member, and a flexible forepart sole member permanently secured in the depression in the forward portion of said member.

LEWIS J. BAZZONI.